United States Patent [19]

Atkinson et al.

[11] Patent Number: 5,331,053
[45] Date of Patent: Jul. 19, 1994

[54] FIBRID REINFORCED ELASTOMERS

[75] Inventors: Dexter L. Atkinson; Arnold Frances, both of Wilmington, Del.; Lee J. Hesler, Richmond, Va.

[73] Assignee: E. I. Du Pont de Nemours and Company, Wilmington, Del.

[21] Appl. No.: 629,657

[22] Filed: Dec. 14, 1990

[51] Int. Cl.[5] .................. C08L 77/00; C08L 9/04; C08L 9/08
[52] U.S. Cl. ...................... 525/184; 525/183; 525/233; 525/238; 525/425
[58] Field of Search .................. 525/184, 425

[56] References Cited

U.S. PATENT DOCUMENTS

| | | | |
|---|---|---|---|
| 2,999,788 | 9/1961 | Morgan | 162/146 |
| 3,969,568 | 7/1976 | Sperley | 525/184 |
| 4,309,531 | 1/1982 | Kyritsos et al. | 528/339 |
| 4,514,541 | 4/1985 | Frances | 524/514 |
| 4,515,656 | 5/1985 | Memeger, Jr. | 162/101 |
| 4,557,969 | 12/1985 | Berbner et al. | 428/283 |
| 4,585,811 | 4/1986 | Preis et al. | 523/206 |
| 4,588,780 | 5/1986 | Edwards et al. | 525/184 |
| 4,833,191 | 5/1989 | Bushway et al. | 524/473 |
| 4,871,004 | 10/1989 | Brown et al. | 152/209 R |
| 5,006,603 | 4/1991 | Takaki et al. | 525/105 |

FOREIGN PATENT DOCUMENTS 2746533 4/1979 Fed. Rep. of Germany .
2448870 10/1980 France .

*Primary Examiner*—Ana L. Carrillo

[57] ABSTRACT

Polymeric fibrids reinforce elastomers to yield well-blended products of high modulus and elongation.

5 Claims, No Drawings

FIBRID REINFORCED ELASTOMERS

BACKGROUND OF THE INVENTION

The reinforcement of rubber and other elastomers with carbon black, p-aramid pulp and other materials is well known. See for example, U.S. Pat. Nos. 4,514,541 and 4,871,004. The use of fibrids in fibrid/elastomer compositions provides a simplified and more effective way of reinforcement over previously known fiber-/elastomer compositions. The use of fibrids simplifies the mixing of the reinforcer and the elastomer, said mixing usually done in conventional "rubber" mixing equipment, such as Banbury, roll mill, extruder, etc. using well-known mixing techniques. Although these fibrids can be added as a masterbatch (pre-mixed with elastomers and/or other—usually solid—ingredients), in many cases they can be added even in the form of the "never-dried" product, i.e., containing substantial amounts of moisture. In case of rubber compositions which "set" due to chemical cross linking, this moisture is usually eliminated during the processing (mixing, calendering, molding) operations. With the thermoplastic elastomers this is not the case, and it is advisable to remove most or all of the moisture from the "never-dried" product prior to its addition to the elastomer.

Some of the prior art reinforced elastomeric products exhibit high modulus at low elongation but fail at high elongation. Other reinforcements present manufacturing problems because they are difficult to blend in with the elastomer and result in directional products. Poor blending is manifested by voids and flaws in the end product. Still other agents do not provide the desired degree of modulus improvement. The present invention seeks to overcome these deficiencies.

SUMMARY OF THE INVENTION

This invention provides an elastomer composition reinforced with from 0.5 to 60 parts per hundred (phr), based on the weight of the elastomer, of polymeric fibrids. Preferably such fibrids are formed of poly(m-phenylene isophthalamide)(MPD-I) and still more preferably are "never-dried" MPD-I fibrids.

DETAILED DESCRIPTION OF THE INVENTION

The reinforced elastomer compositions to which the present invention is directed, contain a major amount of the elastomer component which may be a natural or synthetic (including thermoplastics) rubber. In addition to the elastomer component, various conventional additives such as antioxidants, fillers, etc. are commonly included, for example:

"Hi-Sil" 233—a precipitated hydrated amorphous silica reinforcing agent.

Paraflux—a polymerized saturated petroleum hydrocarbon plasticizer.

Agerite Resin D—An antioxidant. Polymerized 1,2-dihydro-2,2,4-trimethyl-1-quinoline.

Arofene Resin 8318—A tackifier. Octylphenol formaldehyde, non-heat reactive.

N339 HAF carbon black reinforcing agent.

Cydac or Santocure—An accelerator, N-cyclohexyl-2-benzothiazole sulfenamide.

Crystex 20% Oiled Sulfur—A vulcanizer. Bloom retardant. Polymerized sulfur.

Santogard PVI (100%)—A retarder, N-(Cyclohexylthio) phthalimide.

Nochek 4607—An antioxidant—Microcrystalline blend.

Flexone 3C—An antioxidant. N-isopropyl-N'phenyl-P-phenylene diamine.

Sundex 8125—A plasticizer. Highly aromatic oil, ASTM D 2226, Type 101.

Elastomers used in the examples which follow are:

Neoprene FB—A low molecular weight polychloroprene suitable for use as vulcanizable plasticizer for neoprene and other synthetic elastomers.

Nordel ® 1040—A sulfur-curable, low viscosity hydrocarbon rubber, Ethylene-Propylene-Diene Polymethylene (EPDM).

SBR 1712—Styrene butadiene rubber

RSS #1—Natural rubber. Virgin rubber comprised of coagulated rubber sheets which have been properly dried and smoked.

Hytrel ® 4056—Thermoplastic Polyester Elastomer.

The fibrids to be added may comprise any of those described in Morgan U.S. Pat. No. 2,999,788 or others. Fibrids of MPD-I are particularly preferred when hydrolytic stability and resistance to degradation at elevated temperatures is required.

Unexpectedly high modulus has been observed in elastomeric compositions prepared by adding MPD-I fibrids which have not been dried to the elastomer batch. Such fibrids sometimes referred to as "never dried" are described in U.S. Pat. No. 4,515,656. Those fibrids containing from about 30 to about 95% by wt. of water impart exceptionally high modulus to the elastomer and are preferred where this is the property most needed. Fibrids containing little water provide elastomers of greater elongation but more limited modulus.

From about 1 to 30 phr of fibrids are normally combined with the elastomer, although as little as 0.5 phr will give an improvement in results.

In preparing the elastomer batch, the fibrids may be mixed in with the elastomer using conventional "rubber" mixing equipment, such as Banbury, roll mill, extruder, etc. using well-known mixing techniques. Although these fibrids can be added as a masterbatch (pre-mixed in proportions of about 100 to 500 phr fibrids with elastomers and/or other—usually solid—ingredients), in many cases they can be added even in the form of the "never-dried" products. In case of rubber compositions which "set" due to chemical cross linking, this moisture is usually eliminated during the processing (mixing, calendering, molding) operations. With thermoplastic elastomers this is not the case, and it is advisable to remove most or all of the moisture from the "never-dried" product prior to its addition to the elastomer.

The particulate elastomeric composition of the present invention is useful in the preparation of power transmission belts, rocket insulating liners, seals, packing, gaskets, tank treads, tires conveyor belts, hoses, protective clothing (e.g. gloves), wheels and many other uses.

As compared to elastomers reinforced solely with carbon black, those of the present invention are markedly superior in modulus. As compared to poly(p-phenylene terephthalamide) pulp reinforced elastomers, those of the present invention are more readily blended with the elastomers and in general are superior with respect to elongation while exhibiting useful modulus.

Tests and Measurements

Physical properties are measured at room temperature on all samples. In all cases, at least 3 replicates per sample were run. Measurements are by the following methods:

Modulus (Stress/Strain): ASTM D-412-87 for crosslinked, chemically cured elastomers. ASTM-D-638-89 for thermoplastic elastomers.

Cut Growth Using Bead Area Endurance Test

This test is designed to assess the failure of passenger and truck tires due to pro-existing sidewall cuts while the tire is under load and speed.

The tire sidewall is cut in four equal spacings ½" in length, 1/16" deep, one each in the horizontal, vertical, left 45 degrees and right 45 degrees positions. The tire is then subjected to the Bead Area Endurance test for maximum flex.

The tire is mounted on an appropriate heavy-duty test rim and conditioned at 100° F. for 4 hours at 24 psi. The pressure is adjusted to the maximum psi allowed for the specific load range and then conditioned for another 4 hours.

The tire is then tested at 30 mph in the following sequence until failure: 90% rated load, 2 hours; 115% load, 2 hours; 150% load, 20 hours; 170% load, 20 hours; 190% load, 20 hours; and 210% load, until failure.

The following examples are illustrative of the invention (except for comparative examples or controls) and are not intended as limiting.

EXAMPLE 1

985 grams of never-dried MPD-I fibrids (premeasured at 13% solids content to give equivalent weight of 128 grams dry-basis fibrids) were air dried overnight in an oven at 100° C. The dried fibrids were placed in an Eirich mixer with 128 grams of Hi-Sil 233 for two minutes, the mixer was shut down, the sides wiped and then run an additional two minutes. The 256 grams of mix was added to a Banbury mixer along with 512 grams of Nordel® 1040, 128 grams of Neoprene FB, and 99 grams of Hi-Sil 233. The mixer was run until the temperature reached 93° C. The dry ingredients were then brushed down, and the mixer run until the temperature reached 116° C. The mixer is shut down and the elastomer mixture removed. The mixture is placed on a roll-mill and the remaining dry ingredients (Table 1) added slowly. Milling was continued until these remaining dry ingredients were uniformly blended. The compounded rubber sheet was slit and removed from the roll, cut to size, and cured for 30 minutes at 160° C. at 8,625 kPa.

A control was prepared in the Banbury using the same procedure and quantities above except no MPD-I fibrids were added.

A comparison composition was prepared using the same procedures and quantities above except 128 grams of poly(p-phenylene terephthalamide)(PPD-T) pulp were substituted for the fibrids in the Banbury.

TABLE 1

| | Formulations, grams | | |
|---|---|---|---|
| Ingredient | Control (no fibrid) | Comparison (20 phr pulp) | Example 1 (20 phr fibrids) |
| Nordel® 1040 | 512 | 512 | 512 |
| Neoprene FB | 128 | 128 | 128 |
| "Hi-Sil" 233 | 227 | 227 | 227 |
| MPD-I fibrid | 0 | 0 | 128 |
| PPD-T pulp | 0 | 128 | 0 |
| Zinc Oxide | 32 | 32 | 32 |
| Sulfur | 9.6 | 9.6 | 9.6 |
| MBT (a) | 6.4 | 6.4 | 6.4 |
| Methyl Tuads (b) | 3.2 | 3.2 | 3.2 |
| Butyl Zimate (c) | 12.8 | 12.8 | 12.8 |

(a) 2-mercaptobenzothiazole, accelerator
(b) tetramethylthiuram disulfide, accelerator
(c) zinc dibutyldithiocarbamate, accelerator Results are shown in Table 2.

TABLE 2

| | Control (no fibrid) | | Comparison (pulp) | | Example 1 (fibrids) | |
|---|---|---|---|---|---|---|
| Test | MD | CMD | MD | CMD | MD | CMD |
| Modulus, RT (1) | | | | | | |
| 10% | 74 | 69 | 1576 | 279 | 450 | 265 |
| 20% | 113 | 106 | 1699 | 373 | 612 | 351 |
| 30% | 141 | 131 | brk | 448 | 708 | 405 |
| 50% | 178 | 164 | brk | 576 | 799 | 487 |
| 100% | 236 | 215 | brk | 803 | 820 | 01 |
| Breaking Elongation %, RT | 439 | 417 | 20 | 125 | 195 | 286 |

(1) RT is Room Temperature. Results shown as stress in psi at different % Elongation levels. Results are shown in the machine direction (MD) and cross machine direction (CMD).

EXAMPLE 2

Never-dried MPD-I fibrids (premeasured at 13% solids) were opened using the forces of a turbulent air milling known as an Ultra-Rotor. Partial drying was achieved concurrently through the use of an attached, adjustable heat load drying section. The resulting milled fibrids were measured at 34% solids. 95 grams of these partially dried, ultra-rotored fibrids (32 grams fibrids dried weight basis) were combined with 32 grams of N-339 HAF Carbon Black in a tumble mixer for 7 minutes. The 127 grams of mix was added to a Banbury mixer along with all the ingredients in Table 3 except for the Cydac, Crystex, and Santogard. The Banbury was run using standard Banbury mixing techniques, not exceeding 149° C. The mix was dumped, cooled, and put through the Banbury again, now adding the Cydac, Crystex, and Santogard, again not exceeding 149° C. The mixer was shut down and the elastomer mixture removed. The mixture was milled on a roll mill using cooling water. The compounded rubber sheet was slit and removed from the roll, cut to size, and cured for 30 minutes at 160° C. at 8,625 kPa.

A control was prepared in the Banbury using the same procedure and quantities above except no fibrids were added.

A comparison composition was prepared using the same procedures and quantities above except 32 grams of PPD-T pulp were substituted for the MPD-I fibrids in the Banbury.

TABLE 3

| | Formulations, grams | | |
|---|---|---|---|
| Ingredient | Control (no fibrid) | Comparison (5 phr pulp) | Example 2 (5 phr fibrid) |
| RSS #1 | 640 | 640 | 640 |
| Stearic Acid | 12.8 | 12.8 | 12.8 |
| Zinc Oxide | 32 | 32 | 32 |

TABLE 3-continued

| Ingredient | Formulations, grams | | |
|---|---|---|---|
| | Control (no fibrid) | Comparison (5 phr pulp) | Example 2 (5 phr fibrid) |
| MPD-I fibrid | 0 | 0 | 32 |
| PPD-T pulp | 0 | 32 | 0 |
| N-339 HAF Carbon Black | 352 | 352 | 352 |
| Paraflux | 32 | 32 | 32 |
| Agerite Resin D | 6.4 | 6.4 | 6.4 |
| Arofene Resin 8318 | 19.2 | 19.2 | 19.2 |
| Cydac or Santocure | 4.48 | 4.48 | 4.48 |
| Crystex 20% Oiled Sulfur | 20.03 | 20.03 | 20.03 |
| Santogard PVI (100%) | 1.92 | 1.92 | 1.92 |

Results are shown in Table 4

TABLE 4

| Test | Control (no fibrid) | | Comparison (5 phr pulp) | | Example 2 (5 phr fibrid) | |
|---|---|---|---|---|---|---|
| | MD | CMD | MD | CMD | MD | CMD |
| Modulus, RT (1) | | | | | | |
| 10% | 114 | 117 | 907 | 175 | 443 | 190 |
| 20% | 160 | 165 | 1145 | 245 | 606 | 262 |
| 30% | 191 | 200 | 1176 | 298 | 704 | 322 |
| 50% | 247 | 266 | 1156 | 391 | 816 | 430 |
| 100% | 438 | 489 | 1168 | 659 | 1049 | 728 |
| Breaking Elongation %, RT | 485 | 427 | 348 | 319 | 317 | 262 |

(1) RT is Room Temperature. Results shown as stress in psi at different % Elongation levels.

EXAMPLE 3

A quantity of never-dried MPD-I fibrids (premeasured at 13% solids content) were opened using the forces of a turbulent air milling known as an Ultra-rotor. Partial drying was achieved concurrently through the use of an attached, adjustable heat load drying section. The resulting milled fibrids were measured at 55% solids. 233 grams of this partially dried, ultra-rotored fibrids (128 grams fibrids dried weight basis) were combined with 128 grams of Hi-Sil 233 and tumble mixed for 5 minutes. The 361 grams of mix was added to a Banbury mixer along with 512 grams of Nordel® 1040, 128 grams of Neoprene FB, and 99 grams of Hi-Sil 233. The mixer is run using standard Banbury mixing techniques until the temperature reaches 93° C. The mixer is shut down, dry ingredients brushed down, restarted and ran until the temperature reaches 116° C. The mixer is shut down and the elastomer mixture removed. The mixture is placed on a roll mill and the remaining dry ingredients (Table 5) added slowly. Milling is continued until these remaining dry ingredients are uniformly blended. The compounded rubber sheet is slit and removed from the roll, cut to size, and cured for 30 minutes at 160° C. at 8,625 kPa.

A control was prepared in the Banbury using the same procedure and quantities above except no fibrids were added.

TABLE 5

| Ingredient | Formulations, grams | |
|---|---|---|
| | Control (no fibrid) | Example 3 20 phr fibrid |
| Nordel$^R$ 1040 | 512 | 512 |
| Neoprene FB | 128 | 128 |
| "Hi-Sil" 233 | 227 | 227 |
| MPD-I fibrid | 0 | 128 |

TABLE 5-continued

| Ingredient | Formulations, grams | |
|---|---|---|
| | Control (no fibrid) | Example 3 20 phr fibrid |
| Zinc Oxide | 32 | 32 |
| Sulfur | 9.6 | 9.6 |
| MBT | 6.4 | 6.4 |
| Methyl Tuads | 3.2 | 3.2 |
| Butyl Zimate | 12.8 | 12.8 |

Results are shown in Table 6.

TABLE 6

| Test | Control (no fibrid) | | Example 3 (fibrids) | |
|---|---|---|---|---|
| | MD | CMD | MD | CMD |
| Modulus, RT (1) | | | | |
| 10% | 74 | 69 | 1031 | 357 |
| 20% | 113 | 106 | 1153 | 450 |
| 30% | 141 | 131 | brk | 512 |
| 50% | 178 | 164 | brk | 590 |
| 100% | 236 | 215 | brk | brk |
| Breaking Elongation %, RT | 439 | 417 | 21 | 85 |

(1) RT is Room Temperature. Results shown as stress in psi at different % Elongation levels. brk indicates sample has broken before reaching this point.

EXAMPLE 4

Never-dried MPD-I (premeasured at 13% solids) were opened using the forces of a turbulent air milling known as an Ultra-Rotor. Partial drying was achieved concurrently through the use of an attached, adjustable heat load drying section. The resulting milled fibrids were measured at 67% solids. 48 grams of these partially dried, ultra-rotored fibrids (32 grams fibrids dried weight basis) were combined with 32 grams of N-339 HAF Carbon Black in a tumble mixer for 7 minutes. The 80 grams of mix was added to a Banbury mixer along with all the ingredients in Table 7 except for the Cydac, Crystex, and Santogard. The Banbury is run using standard Banbury mixing techniques, not exceeding 149° C. The mix is dumped, cooled, and run through the Banbury again, now adding the Cydac, Crystex, and Santogard again not exceeding 149° C. The mixer is shut down and the elastomer mixture removed. The mixture is milled on a roll mill using cooling water. The compounded rubber sheet is slit and removed from the roll, cut to size, and cured for 30 minutes at 160° C. at 8,625 kPa.

A control was prepared in the Banbury using the same procedure and quantities above except no fibrids were added.

TABLE 7

| Ingredient | Formulations, grams | |
|---|---|---|
| | Control (no fibrid) | Example 4 (5 phr fibrid) |
| RSS #1 | 640 | 640 |
| Stearic Acid | 12.8 | 12.8 |
| Zinc Oxide | 32 | 32 |
| MPD-I fibrid | 0 | 32 |
| N-339 HAF Carbon Black | 352 | 352 |
| Paraflux | 32 | 32 |
| Agerite Resin D | 6.4 | 6.4 |
| Arofene Resin 8318 | 19.2 | 19.2 |
| Cydac or Santocure | 4.48 | 4.48 |
| Crystex 20% Oiled Sulfur | 20.03 | 20.03 |
| Santogard PVI | 1.92 | 1.92 |

TABLE 7-continued

| | Formulations, grams | |
|---|---|---|
| Ingredient | Control (no fibrid) | Example 4 (5 phr fibrid) |
| (100%) | | |

Results are shown in Table 8.

TABLE 8

| | Control (no fibrid) | | Example 4 (5 phr fibrid) | |
|---|---|---|---|---|
| Test | MD | CMD | MD | CMD |
| Modulus, RT (1) | | | | |
| 10% | 114 | 117 | 194 | 144 |
| 20% | 160 | 165 | 293 | 207 |
| 30% | 191 | 200 | 364 | 255 |
| 50% | 247 | 266 | 469 | 348 |
| 100% | 438 | 489 | 681 | 616 |
| Breaking Elongation %, RT | 485 | 427 | 377 | 305 |

(1) RT is Room Temperature. Results shown as stress in psi at different % Elongation levels.

EXAMPLE 5

A quantity of never-dried MPD-I fibrids (premeasured at 13% solids content) were opened using Ultrarotor. Partial drying was achieved concurrently through the use of an attached, adjustable heat load drying section. The resulting milled fibrids were measured at 93% solids. 69 grams of this partially dried, ultra-rotored fibrids (64 grams fibrids dried weight basis) were combined with 64 grams of PPD-T pulp and with 128 grams Hi-Sil 233 and tumble mixed for 5 minutes. The 261 grams of mix was added to a Banbury mixer along with 512 grams of Nordel® 1040, 128 grams of Neoprene FB, and 99 grams of Hi-Sil 233. The mixer is run using standard Banbury mixing techniques until the temperature reaches 93° C. The mixer is shut down, dry ingredients brushed down, restarted and ran until the temperature reaches 116° C. The mixer is shut down and the elastomer mixture removed. The mixture is placed on a roll mill and the remaining dry ingredients (Table 9) added slowly. Milling is continued until these remaining dry ingredients are uniformly blended. The compounded rubber sheet is slit and removed from the roll, cut to size, and cured for 30 minutes at 160° C. at 8,625 kPa.

A control was prepared in the Banbury using the same procedure and quantities above except no fibrids were added.

A comparison composition based on PPD-T pulp was prepared using the same procedures and quantities above except 128 grams of pulp were substituted for the fibrids and pulp in the Banbury.

TABLE 9

| | Formulations, grams | | |
|---|---|---|---|
| Ingredient | Control (no fibrid) | Comparison (20 phr pulp) | Example 5 (10 phr fibrid/10 phr pulp) |
| Nordel<sup>R</sup> 1040 | 512 | 512 | 512 |
| Neoprene FB | 128 | 128 | 128 |
| "Hi-Sil" 233 | 227 | 227 | 227 |
| MPD-I fibrid | 0 | 0 | 64 |
| PPD-T pulp | 0 | 128 | 64 |
| Zinc Oxide | 32 | 32 | 32 |
| Sulfur | 9.6 | 9.6 | 9.6 |
| MBT | 6.4 | 6.4 | 6.4 |
| Methyl Tuads | 3.2 | 3.2 | 3.2 |

TABLE 9-continued

| | Formulations, grams | | |
|---|---|---|---|
| Ingredient | Control (no fibrid) | Comparison (20 phr pulp) | Example 5 (10 phr fibrid/10 phr pulp) |
| Butyl Zimate | 12.8 | 12.8 | 12.8 |

The results are shown in Table 10.

TABLE 10

| | Control (no fibrid) | | Comparison (20 phr pulp) | | Example 5 (10 phr fibrid/10 phr pulp) | |
|---|---|---|---|---|---|---|
| Test | MD | CMD | MD | CMD | MD | CMD |
| Modulus RT (1) | | | | | | |
| 10% | 74 | 69 | 1576 | 279 | 1508 | 316 |
| 20% | 113 | 106 | 1699 | 373 | brk | 410 |
| 30% | 141 | 131 | brk | 448 | brk | 481 |
| 50% | 178 | 164 | brk | 576 | brk | 586 |
| 100% | 236 | 215 | brk | 803 | brk | 731 |
| Breaking Elongation %, RT | 439 | 417 | 20 | 125 | 13 | 109 |

(1) RT is Room Temperature. Results shown as stress in psi at different % Elongation levels.

EXAMPLE 6

1600 grams of never-dried polyacrylonitrile fibrids (8% solids, yielding equivalent dry weight of 128 grams fibrids) were combined with 227 grams of "Hi-Sil" 233 in an Eirich mixer ran for two minutes to mix and open the mixture. The mixer was shut down, the sides wiped down of any material, ran for an additional two minutes, and the mixture removed. The mixture was air-dried overnight in an oven at 100° C. The dry mix was placed in an Eirich mixer and ran for two minutes. The mix was removed, yielding 355 grams. This dry mix was added to a Banbury mixer with 512 grams of Nordel ® 1040, and 128 grams of Neoprene FB. The mixer is run using standard Banbury techniques until the temperature reaches 93° C. The mixer is shut down and dry ingredients are brushed down. The mixer is closed, restarted, and run until the temperature reaches 116° C. when the mixer is shut down and the mixture removed. This mixture is placed on a roll mill, remaining dry ingredients (Table 11) added slowly, and milling continued until the dry ingredients are uniformly mixed. The compounded rubber slab is slit, cut, and cured for 30 minutes at 160° C. at 8,625 kPa.

TABLE 11

| | Formulation, grams |
|---|---|
| Ingredient | Example 6 (20 phr fibrid) |
| Nordel<sup>R</sup> 1040 | 512 |
| Neoprene FB | 128 |
| Acrylic fibrids | 128 |
| "Hi-Sil" 233 | 227 |
| Zinc Oxide | 32 |
| Sulfur | 9.6 |
| MBT | 6.4 |
| Methyl Tuads | 3.2 |
| Butyl Zimate | 12.8 |

Results are shown in Table 12.

TABLE 12

| | Example 6 (20 phr fibrids) | |
|---|---|---|
| Test | MD | CMD |
| Modulus, RT (1) | | |
| 10% | 443 | 264 |
| 20% | 617 | 356 |
| 50% | 808 | 516 |
| 100% | 873 | 652 |
| Breaking Elongation, RT, % | 206 | 289 |

(1) RT is Room Temperature. Results are shown as stress in psi at different % Elongation levels.

EXAMPLE 7

The formulation shown in Table 13 was used in combining the Natural Rubber, SBR 1712, never-dried MPD-I fibrids (about 90% water) Zinc Oxide, Stearic Acid, and the HAF Carbon Black in a Banbury mixer. Following standard Banbury mixing techniques, the elastomer is dropped onto the roll mill where the remaining dry ingredients (Table 13) are added and milling continued to achieve uniform mixing. The compounded sheet is cured at 149° C. for 30 minutes from which samples are cut for lab analysis.

The control was prepared using the same formulation and procedures but with no reinforcing fibrid.

TABLE 13

| | Formulations, phr | |
|---|---|---|
| Ingredient | Control (no fibrid) | Example 7 (5 phr fibrid) |
| RSS #1 | 40 | 40 |
| SBR 1712 | 82.5 | 82.5 |
| MPD-I fibrid | 0 | 5 |
| Zinc Oxide | 3.7 | 3.7 |
| Stearic Acid | 2.5 | 2.5 |
| HAF Black | 43.5 | 43.5 |
| Sundex 8125 | 2.4 | 2.4 |
| Flexzone 3C | 3.0 | 3.0 |
| Nochek 4607 | 2.7 | 2.7 |
| Santocure | 0.95 | 0.95 |
| Crystex 20% Oiled | 2.6 | 2.6 |
| Sulfur | 183.85 | 188.85 |

Results are shown in Table 14.

TABLE 14

| Test | Control (no fibrid) | Example 7 (5 phr fibrid) |
|---|---|---|
| Modulus, RT (1) | | |
| 100% | — | 330 |
| 200% | — | 590 |

TABLE 14-continued

| Test | Control (no fibrid) | Example 7 (5 phr fibrid) |
|---|---|---|
| 300% | 887 | 1034 |
| Breaking Elongation, RT, % | 594 | 426 |
| Tire Cut Growth | | |
| Miles to failure | 2815 | 2362 |
| Load % at failure | 210 | 210 |

(1) RT is Room Temperature. The results are shown as stress in psi at different % Elongation levels. Results are shown in the machine direction (MD). — indicates samples not measured at this level.

EXAMPLE 8

A quantity of never-dried MPD-I fibrids were opened using an Ultra-rotor and partially dried as described in Example 5 to 93% solids. These fibrids were then further dried overnight at 100° C. These dried fibrids were then mixed with powdered Hytrel ® 4056 polyester thermoplastic elastomer in a tumble mixer with a resulting concentration of 3% MPD-I fibrids. This material was dried overnight in a 70° C. oven with Nitrogen purge. The mix was removed from the oven and immediately fed to the screw extruder using standard extruder conditions. The extruded elastomer is water quenched and chopped into pellets. The pellets are then molded for testing using standard molding techniques and conditions. The test specimens are direct molded or die-cut from sheets. The results are shown in Table 15.

TABLE 15

| | Control (no fibrid) | Example 8 (3% fibrid) |
|---|---|---|
| Modulus, RT (1) | | |
| 25%, molded | 960 | 1185 |
| die-cut | 929 | 1198 |
| 100%, molded | 986 | 1297 |
| die-cut | 1068 | 1375 |

(1) RT is Room Temperature. The results are shown as stress in psi at different % Elongation levels. Results are shown in the machine direction (MD).

We claim:

1. An elastomer composition reinforced with from 0.5 to 60 parts of poly(m-phenylene isophthalamide) fibrids per hundred parts of the elastomer.

2. An elastomer composition according to claim 1 wherein the elastomer is natural rubber.

3. An elastomer composition according to claim 1 wherein the elastomer is synthetic rubber.

4. A process for preparing an elastomer composition comprising incorporating into an elastomer from 0.5 to 60 parts of poly(m-phenylene isophthalamide) fibrids per hundred parts of the elastomer.

5. A process according to claim 4 wherein the fibrids are never-dried poly(m-phenylene isophthalamide).

* * * * *